Figure 1:
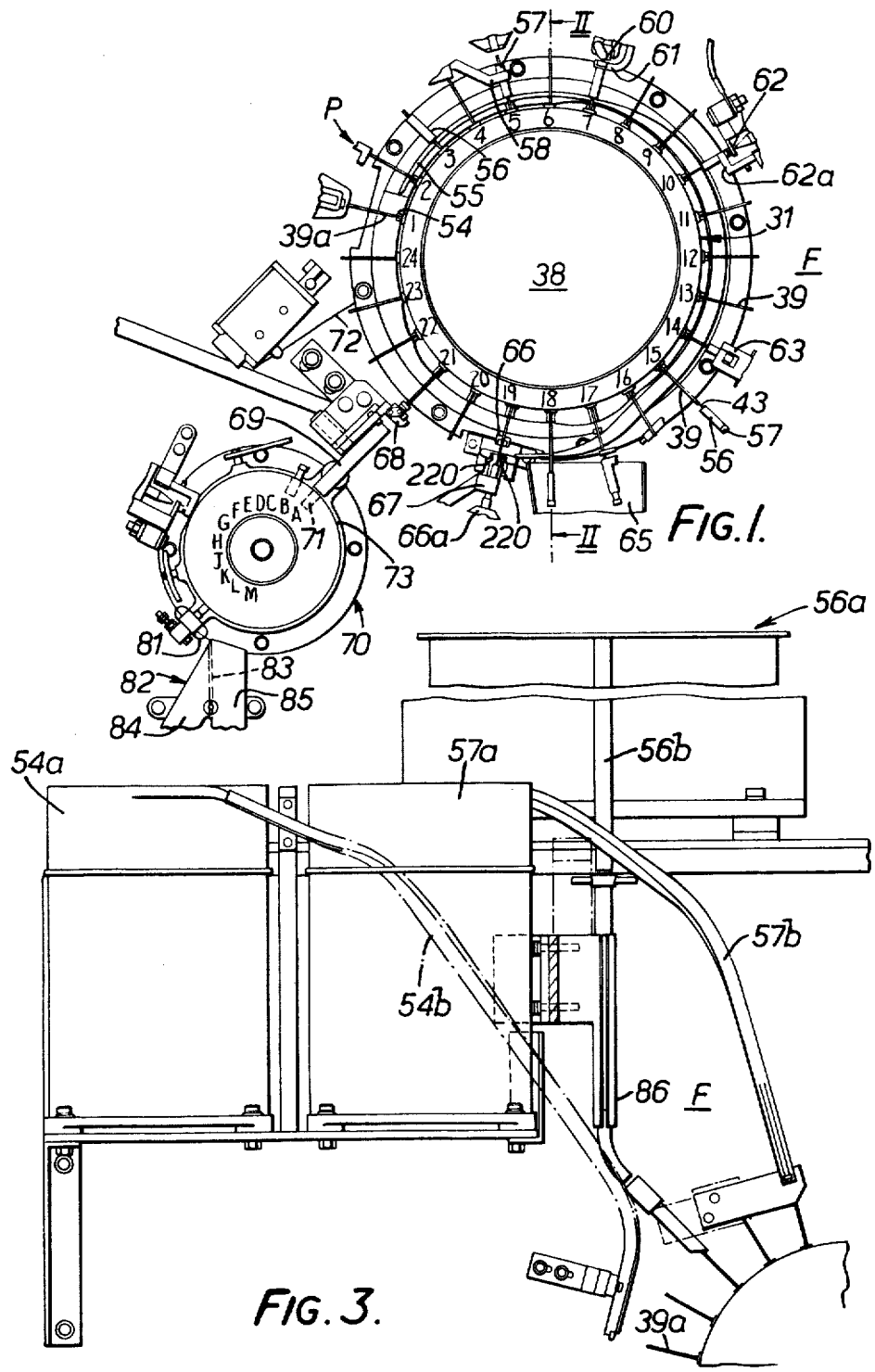

United States Patent [19]
Buchanan et al.

[11] 3,889,336
[45] June 17, 1975

[54] APPARATUS FOR ASSEMBLING COMPONENTS

[75] Inventors: John Brown Buchanan, Crookham; Stanley William Stephens, Lightwater; Julian Pascoe Grenfell, Pyrford, all of England

[73] Assignee: Badalex Limited, Weybridge, England

[22] Filed: Dec. 28, 1973

[21] Appl. No.: 429,159

[30] Foreign Application Priority Data
Jan. 9, 1973  United Kingdom................. 1087/73

[52] U.S. Cl. ............................... 29/203 P; 29/623
[51] Int. Cl. .......................................... H05k 13/00
[58] Field of Search .......... 29/203 P, 203 D, 203 R, 29/623

[56] References Cited
UNITED STATES PATENTS
1,601,069  9/1926  Hofstetter ...................... 29/203 R

*Primary Examiner*—Thomas H. Eager
*Attorney, Agent, or Firm*—Lawrence E. Laubscher

[57] ABSTRACT

Apparatus for assembling a plurality of components, e.g. the end caps and body of a fuse, on an elongate element, e.g. a fuse wire, comprise turret means carrying a plurality of elongate guides for elongate elements, means for indexing the turret means to offer each guide sequentially to a plurality of stations at each of which a component is applied to a guide and to offer each guide sequentially to component positioning means which operate to position the components relative to the element and guide.

25 Claims, 15 Drawing Figures

APPARATUS FOR ASSEMBLING COMPONENTS

This invention is concerned with improvements in and relating to apparatus for assembling components and more particularly to apparatus for manufacturing electrical fuses.

Electrical fuses whose manufacture can be readily effected, for example, comprise a length of fuse wire enclosed in a cylindrical ceramic or glass body and soldered or glued to end caps on the body, an optional filling of sand or silica surrounding the wire within the body to reduce the risk of shatter of the body when the fuse 'blows'.

According to the present invention there is provided apparatus for assembling a plurality of components on a common elongate element, the apparatus including turret means provided with a plurality of elongate guides for elongate elements, means to index the turret means to offer each guide sequentially to a plurality of stations, component feed means at a plurality of stations each operable to apply a component to a guide and component positioning means at at least one station operable to position a component relative to an element in a guide and thereby establish the components relative to the element and to the turret means.

In the case of an electrical fuse of the kind referred to, the components may be fed to a guide in the order of cap, body, cap. At a first positioning station the last fed cap is positioned relative to the free end of the element to prevent that cap moving off the element, the body and the first fed cap being positioned relative to the element and turret by the last fed cap. Preferably the body is positioned in the last fed cap and the first fed cap is positioned on the body. The assembly can then be delivered upon releasing the element from the turret means.

The turret means preferably include a secondary turret having no guides, which receives the components positioned relative to the element from a main turret carrying the guides. On the secondary turret the assemblies are received with the last fed cap first and are indexed to a second positioning station where the first fed cap is positioned directly relative to the element.

Each positioning station is preferably a pair of stations at a first of which the element is bent to overlie the exterior of a cap and at a second of which the element and cap are soldered together.

Figure 2:
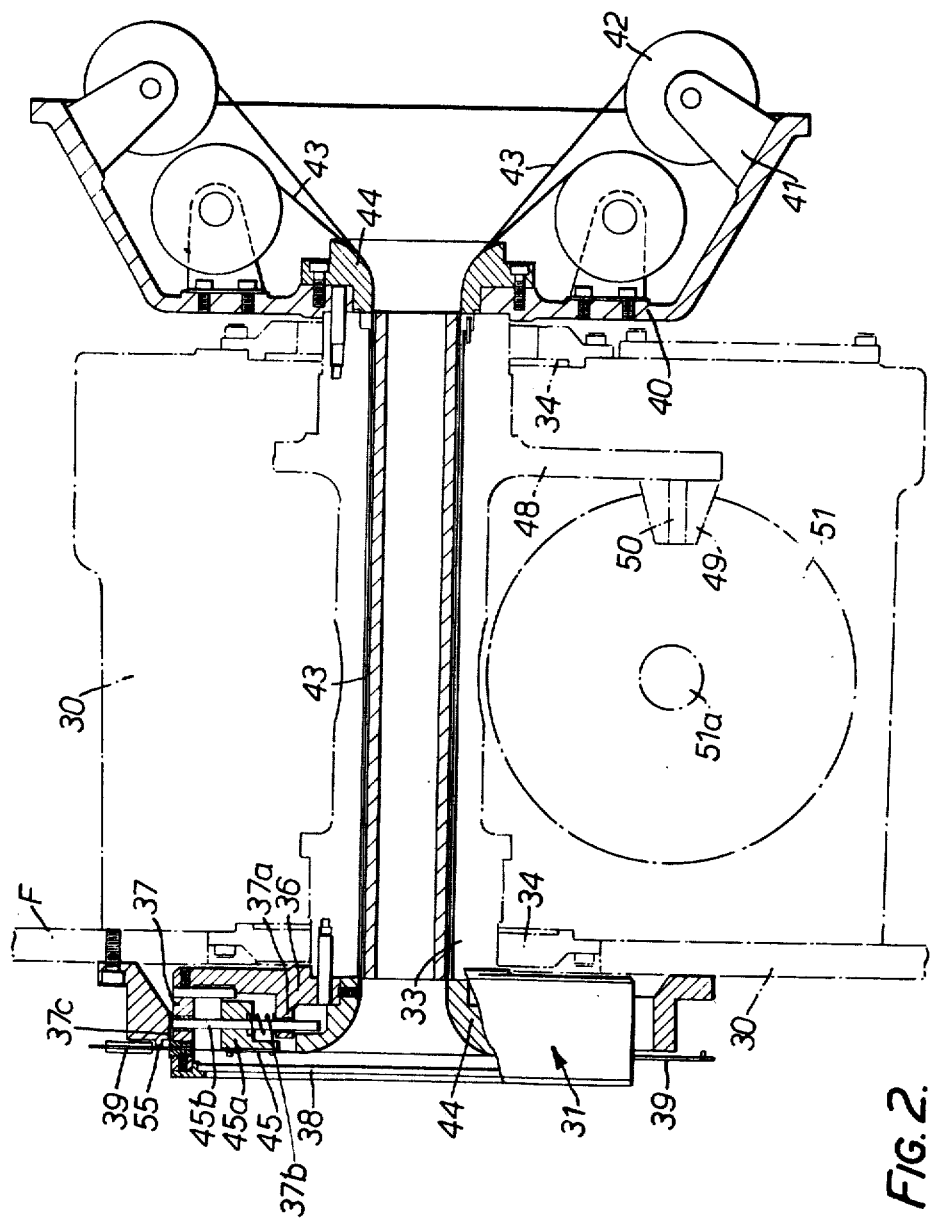
Figure 4:
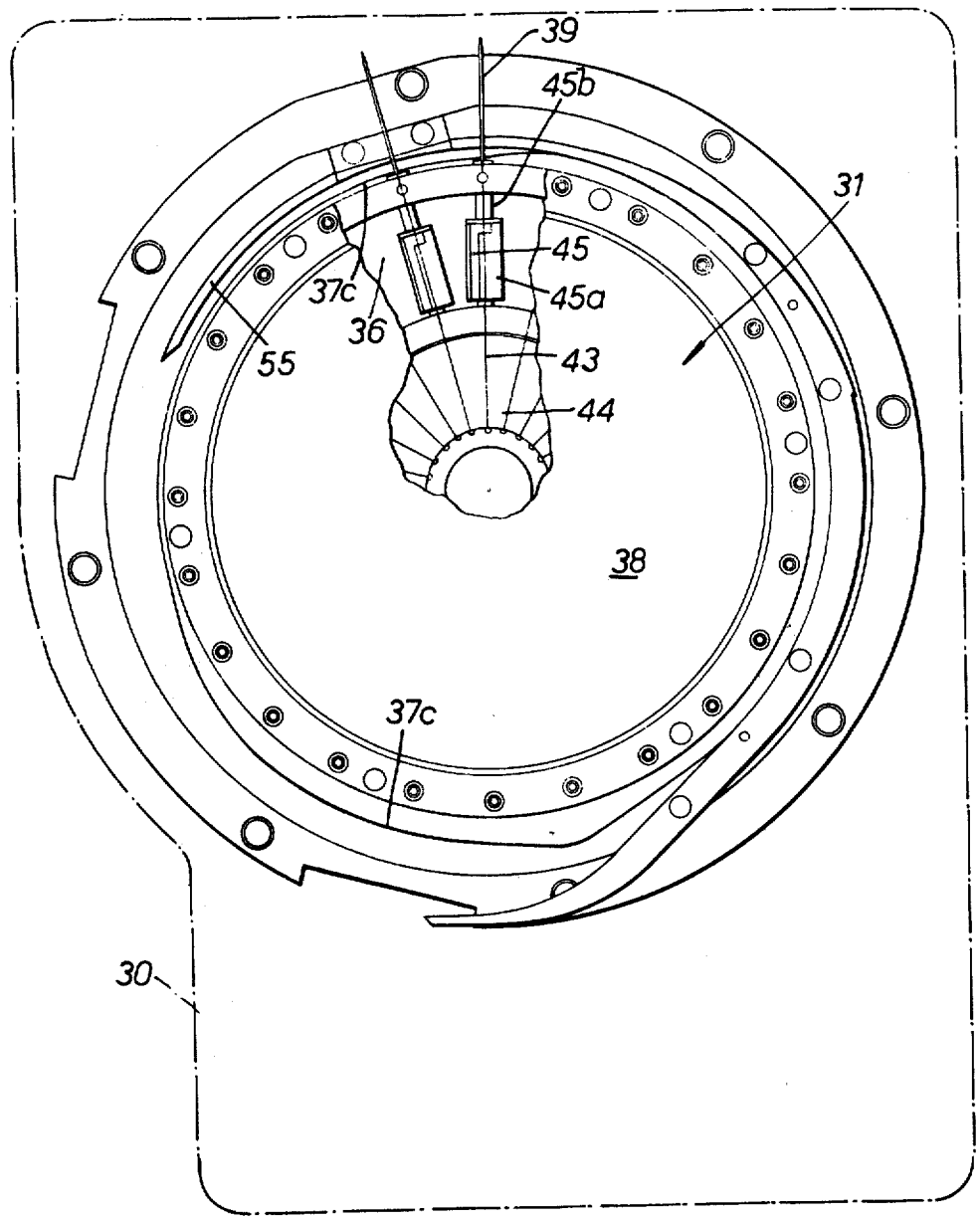
Figure 5:
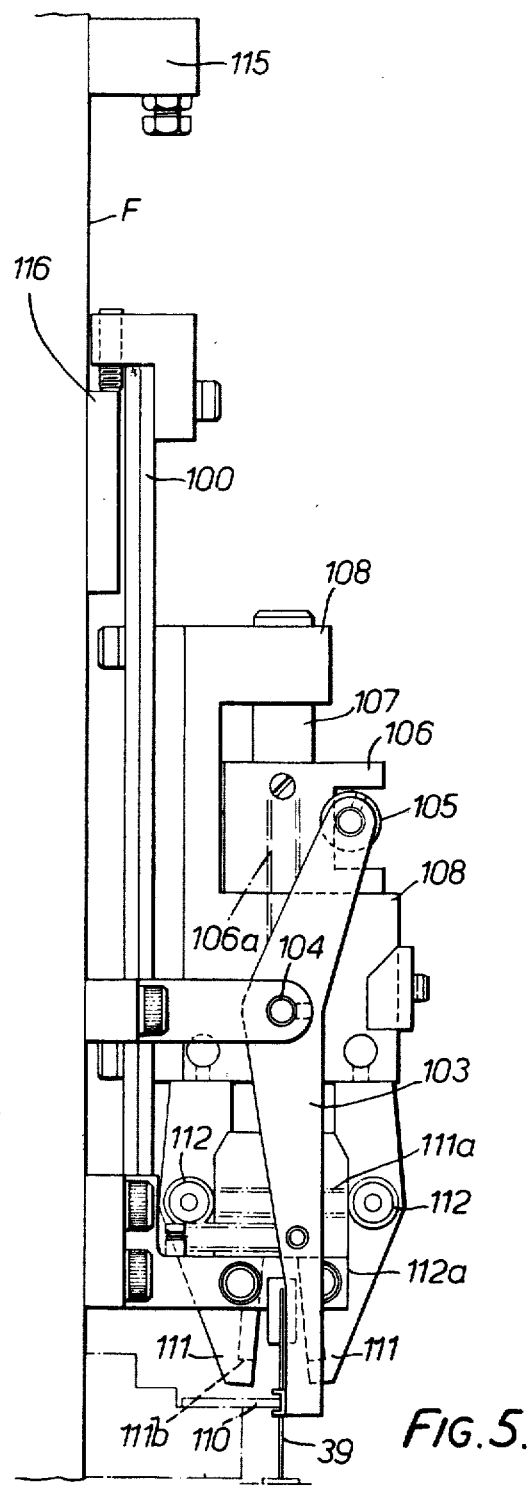
Figure 6:
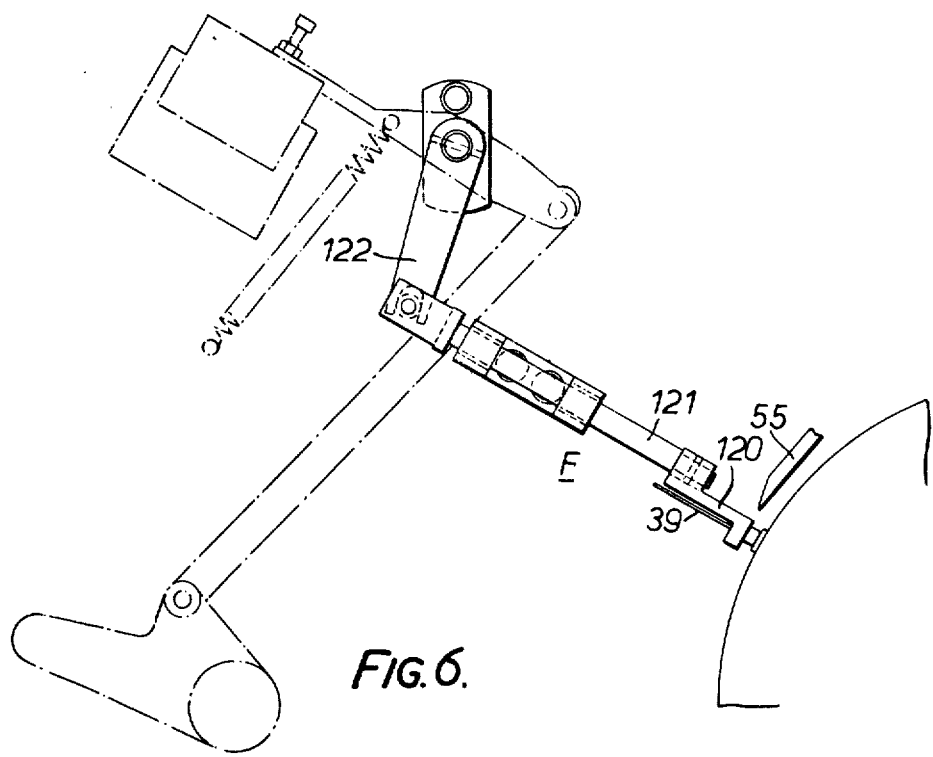
Figure 9A:
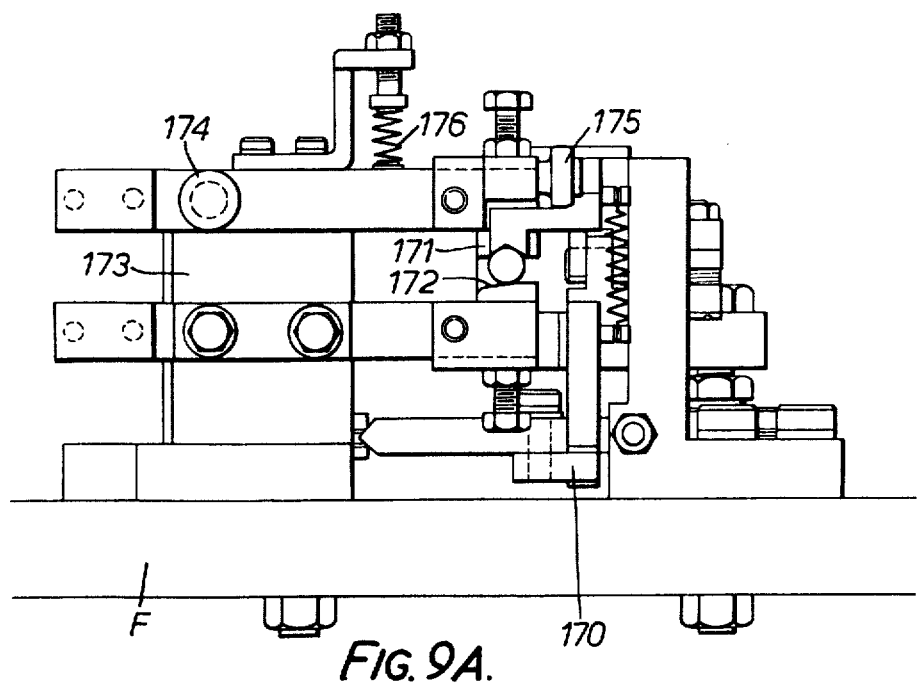
Figure 7:
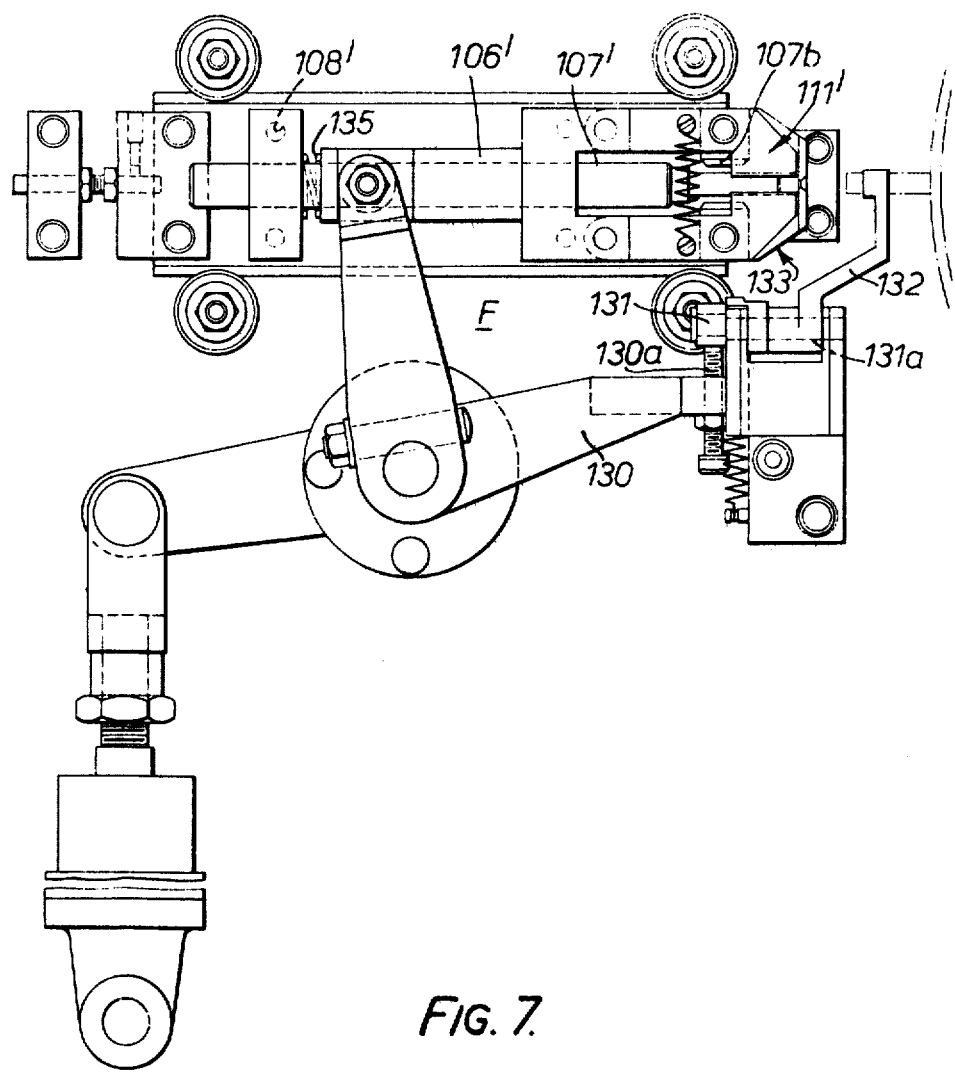
Figure 8:
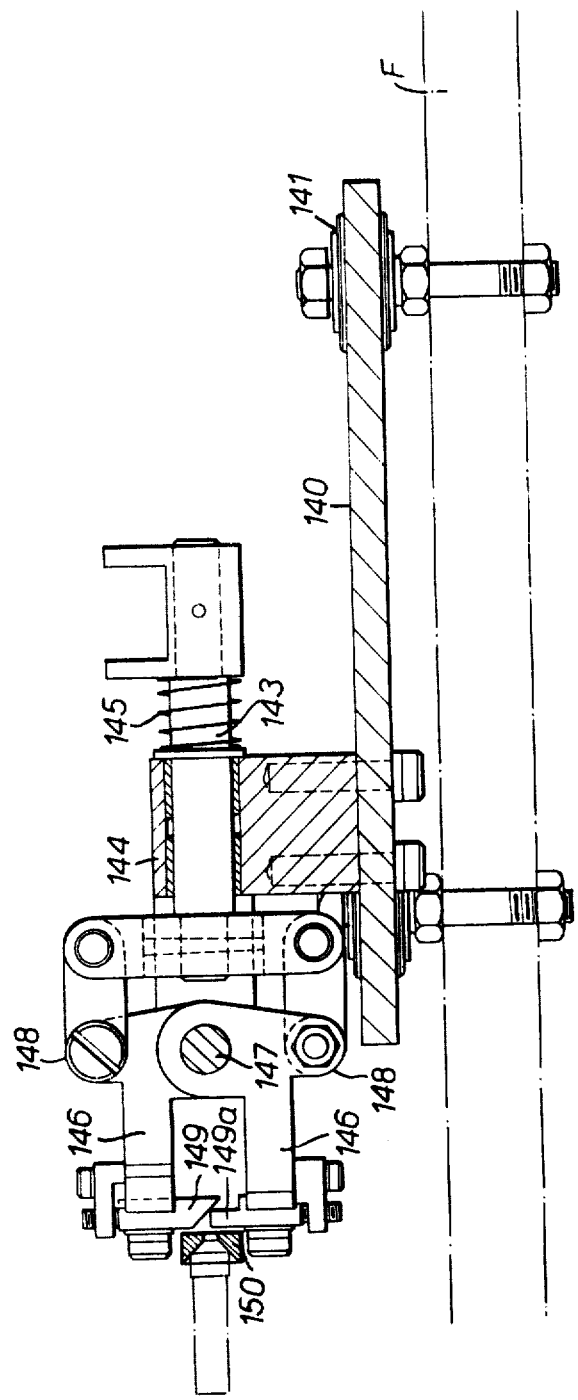
Figure 9:
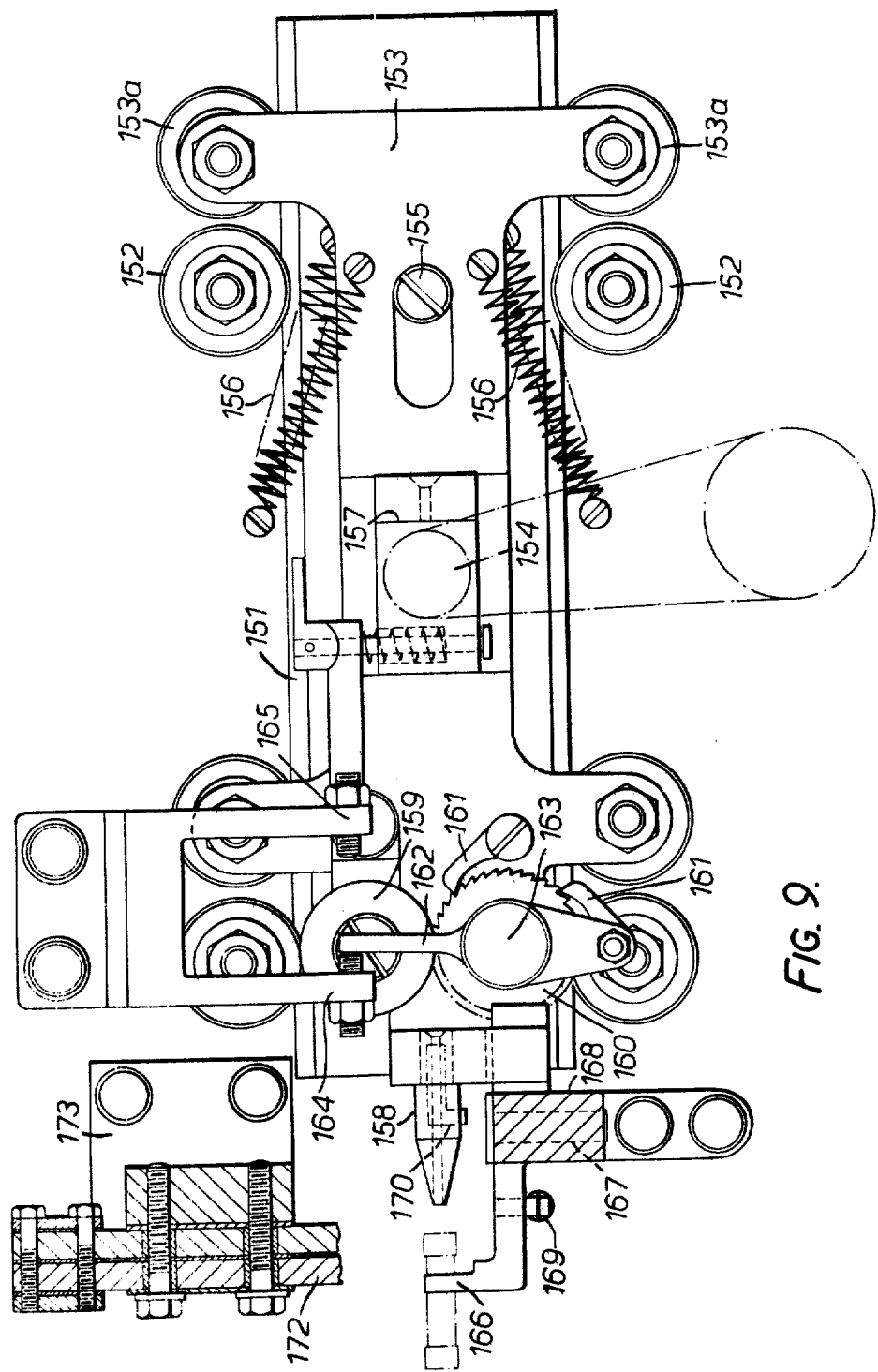
Figure 10:
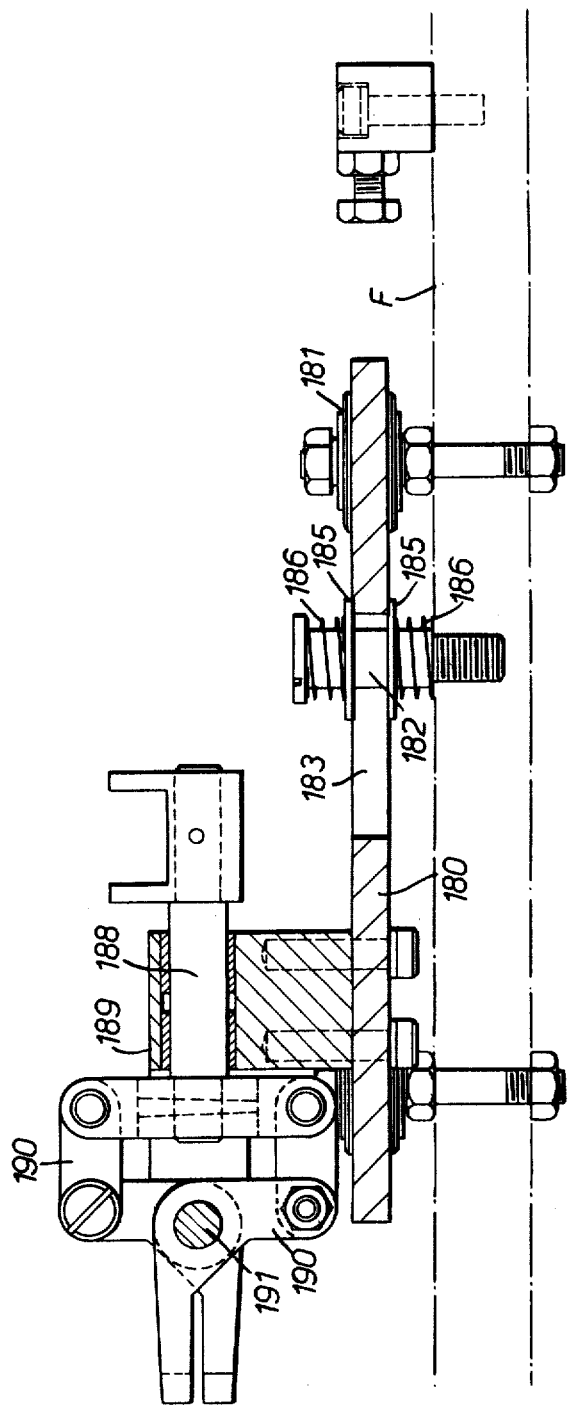
Figure 11:
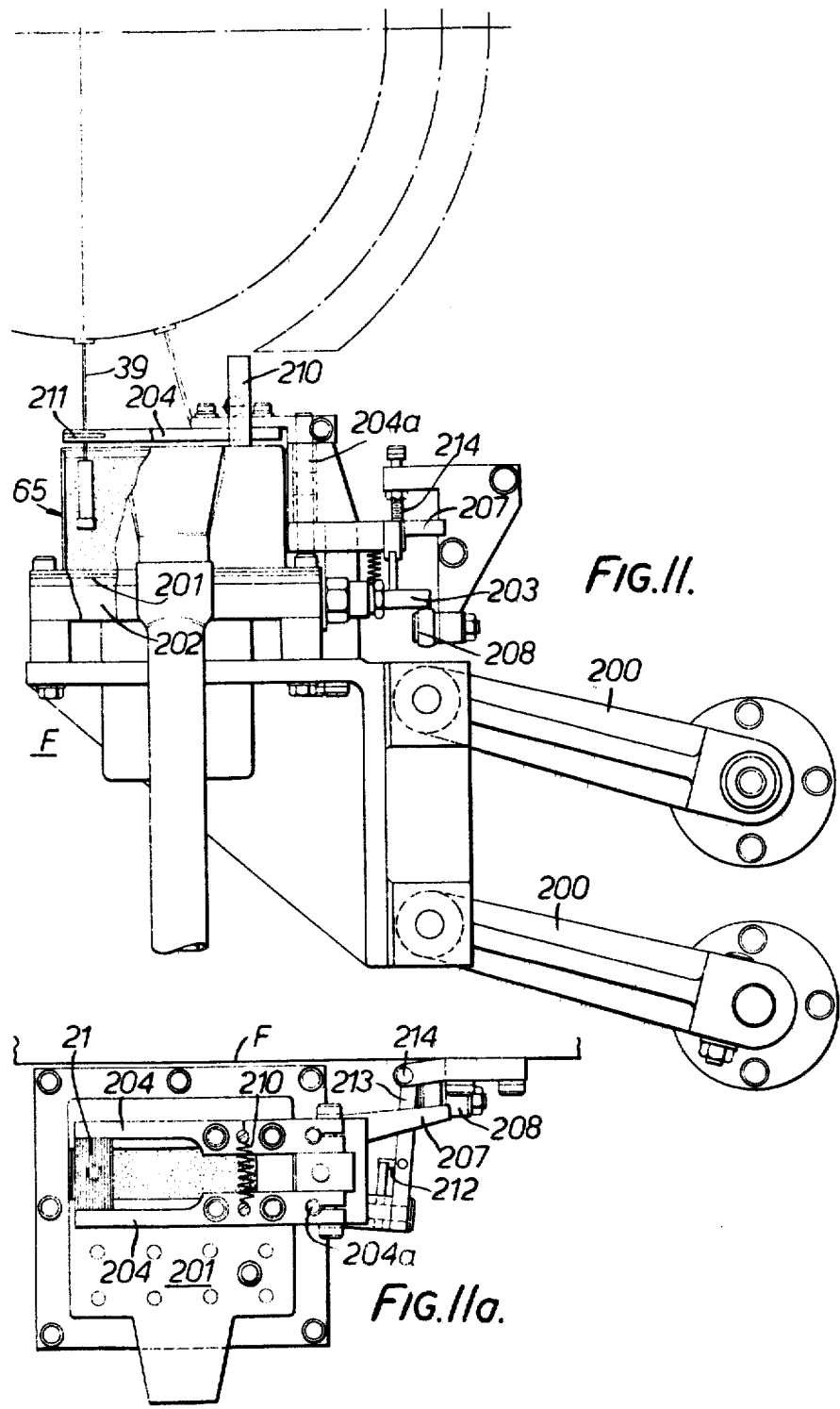
Figure 12:
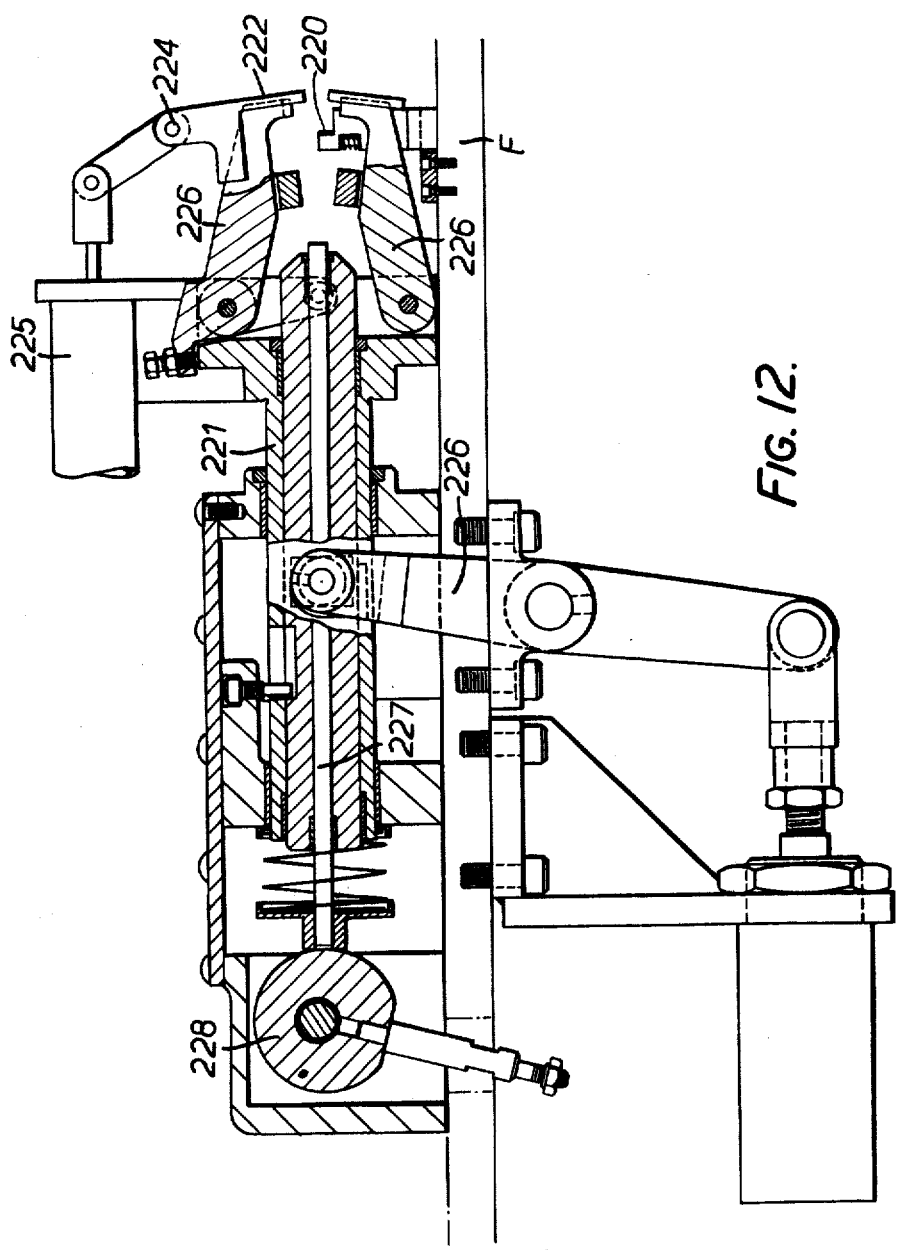
Figure 13:
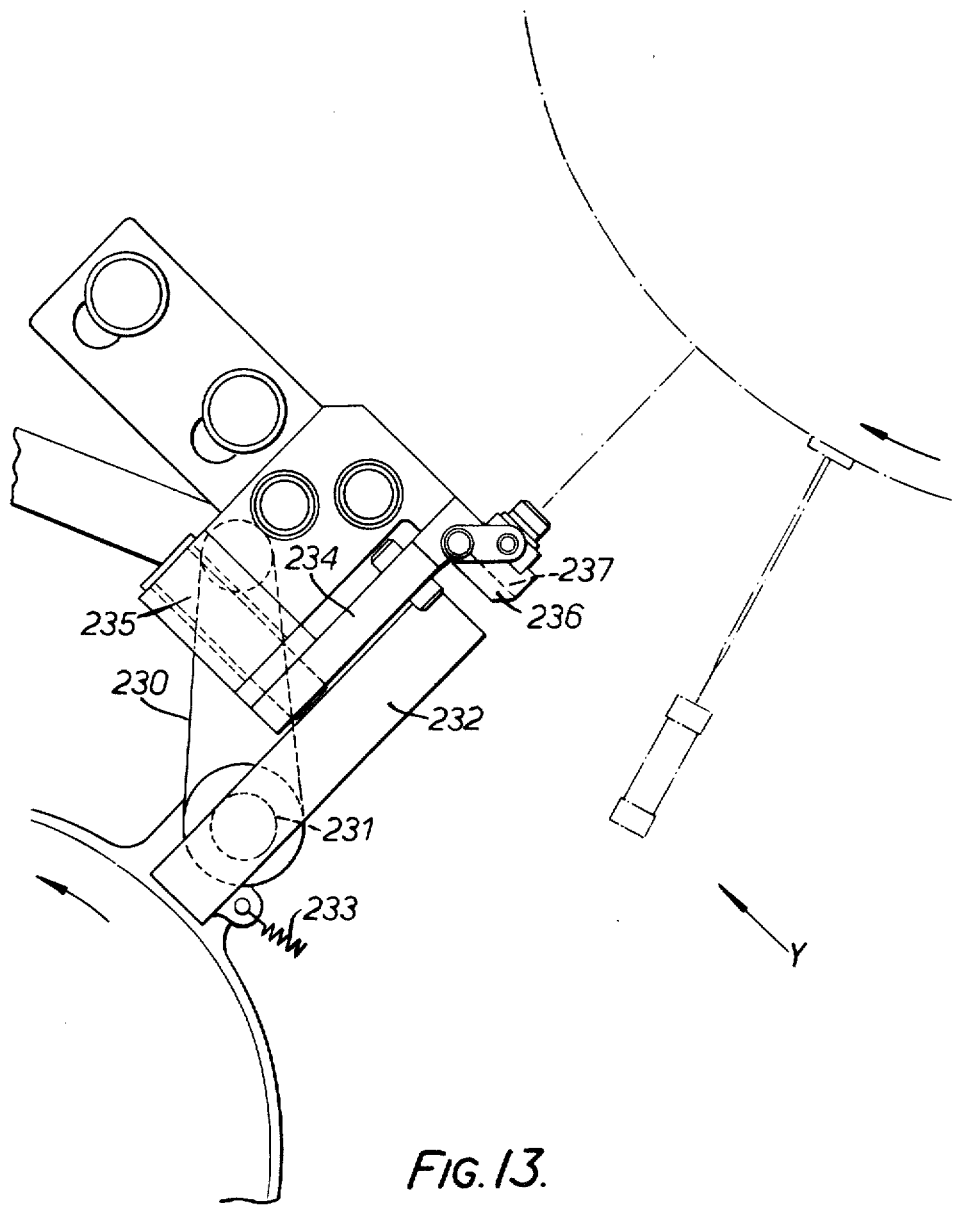

In order that the invention may be well understood there will now be described an embodiment thereof, given by way of example only, reference being had to the accompanying drawings in which:

FIG. 1 is a front elevation of the turrets of an embodiment of assembly apparatus according to the invention for assembling electric fuses, auxiliary elements being largely omitted for clarity, FIG. 2 is a partial cross-section on the line II—II of FIG. 1, FIG. 3 is an elevation of the component feed arrangement, FIG. 4 is a front elevation of the main turret partly broken away to show the cam tracks, FIG. 5 is a side elevation of the first cap applicator viewed in the clockwise direction in FIG. 1, FIG. 6 is a front elevation of the first cap push mechanism, FIG. 7 is a front elevation of the second cap applicator, FIG. 8 is a side elevation of a first positioning device for the last fed cap viewed in the anticlockwise direction of FIG. 1, FIGS. 9 and 9a are a front elevation and an end view of a second positioning device for the last fed cap, parts being broken away in each for clarity, FIG. 10 is a side elevation of an extractor viewed in the anticlockwise direction of FIG. 1, FIGS. 11 and 11a are a front elevation and plan respectively of a filling device, FIG. 12 is a front sectional elevation of a first fed cap assembling device, and FIG. 13 is an elevation of a guillotine and transfer mechanism.

The fuse assembling apparatus comprises a housing 30 having a front plate F and an assembly turret 31 mounted in the housing for rotation about a generally horizontal axis. The assembly turret 31 is mounted on and co-axial with a hollow shaft 33 rotatable in bearings 34 located in opposed end walls of the housing 30. The turret 31 consists of an annular plate 36 extending radially outwardly from shaft 33; an annular flange 37 projecting forwardly from the outer periphery of plate 36; a cover plate 38 mounted on flange 37 and spaced forwardly of annular plate 36; and a series of elongate tubular guides in the form of hollow needles 39 which project radially from flange 37 and communicate with the space between annular plate 36 and cover plate 38. Mounted on the end of shaft 33 remote from turret head 32 is an annular plate 40, extending radially outwardly from the shaft and having a series of carriers 41 for spools 42 mounted around its periphery. Fuse wire 43 carried on the spools can be fed axially through shaft 33, to a corresponding one of the needles 39 of turret head 31, from which it is available for the assembly of fuses. To reduce friction annular PTFE guides 44 are provided and, for each wire, a leaf spring 45 is located on a block 45a to control the advance of the wire in a manner apparent from subsequent description.

The plate 38 of the turret 31 is preferably transparent so that the wires and springs 45 can be checked.

Within housing 30, the shaft 33 is provided with a further annular flange 48 carrying circumferentially spaced tapered rollers 49 mounted on studs 50; there being one roller for each of the spool carriers 41 and needles 39. A one-turn indexing cam 51 mounted on shaft 51a is rotatable by a worm shaft (not shown) to sequentially co-act with rollers 49 to intermittently rotate turret 31 and thereby present each needle at a series of angularly spaced station.

With particular reference to FIG. 1, there is shown an assembly turret 31, having twenty four needles 39, which is sequentially indexed through constant angular displacements of 15° so as to pass the needles in turn through twenty four index positions.

At index position 1, a bottom cap 54 is fed on to, say, needle 39a of the series 39a to 39x, after which the needle is indexed sequentially in a clockwise direction as viewed in FIG. 1. At index position 2, cap 54 is pushed to the base of needle 39a by a pusher P later to be described. In passing from station 2 to station 3 the cap 54 passes under a fixed axially outermost cam track 55 extending around a greater part of the circumference of turret 31 and terminating between index positions 18 and 19. This track holds the inner cap 54 axially of the needle. At index positions 3 and 5 (4 being an idle position) ceramic insulator body 56 and top cap 57, respectively, are fed on to the needle, where they are separated from the cap 54 by cam track 55. At index position 5 the body 56 is centralised by gripping jaws 58 and, while the body is so held, cap 57 is urged on to it by means to be described.

In passing from index position 6, which is an idle station, wire in the needle is advanced to expose a short length beyond cap 57. The wire is gripped by spring 45 and by block 45a. Block 45a is carried by a rod 45b slidable in flanges 37 and 37a and is radially outwardly biased by spring 37b. Outward movement of the rod is controlled by a fixed axially inner cam track 37c which at station 6 starts to diverge radially outwardly from a first circular position running from station 1 to station 6. Movement of rod 45b advances the wire end which, until then, was in the needle, so that the end now projects a short distance beyond the free end of the needle and the cap 57. At indexing position 7 a reciprocated member 60 bends the end of the projecting wire over the lip which bounds the aperture in the cap 57, while the cap is engaged by a support member 61. The needle thereafter is passed to index position 10 where the cap 57 is heated by an element 62, while the body is steadied by jaws 62a and a solder wire is brought up to the cap. At station 14 jaws 63 engage the body and pull the body clear of the needle, thereby exposing the inner end of the body previously occupied by the needle. This condition of the cap 57 and body 56 is visible at station 15.

At index positions 17 and 18 a sand container 65, carried on parallel links 200 (FIG. 11) is vertically reciprocated in sequence with indexing of the assembly turret 31 by suitable means (not shown in FIG. 1), so that while at positions 17 and 18 the fuse body will be immersed in the sand. An air-line (not shown in FIG. 1) communicates with the interior of container 65 via distributing means, for example, a perforate base plate 201, to maintain the sand in a fluidised state. As the container 65 is elevated to immerse the body at index positions 17 and 18, the fluidised bed collapses immediately above the open end of body 56 and the latter thereby is filled with sand. The cam track 37c is also radially outwardly displaced at position 17 to place the body in a position where the open end will be immersed in the sand at position 17 as well as 18.

Cam track 55 starts to progress radially outwardly at position 16 and ends between positions 18 and 19. The cap 54 is able to pass along the needle as it approaches position 18 and can meet the body at position 19. At position 19 the cap 54 is urged on to the body by gripping jaws 66, 66a while the body is centered by jaws 67.

At position 21 a guillotine 68 operates to sever the wire whereupon the body slides down a chute 69 to a second turret 70 where it is received in a recess 71. Thereafter, at index position 22, the wire, the free end of which is projecting beyond the needle, is retracted within the needle by the block 45a being pressed radially inwards of the turret against its bias by cam 37c. The needle then is checked by detecting means 72 at index position 23 to ensure that the assembled fuse component has been removed, and thereafter may be cleaned at index position 24 such as by a harmonic vibrator before passing into the next cycle.

The sub-turret 70 has a rotatable turret head 73, the latter being co-planar with turret head 32 and having a number of fuse receiving recesses as 71 extending radially inwards from the circumference thereof. In the arrangement shown, the turret head 73 has twenty such recesses 71 which can be indexed through twenty positions.

Index position A of turret 70 is radially in line with index position 21 of the turret head 31. After the wire holding an assembly of fuse components on head 31 is cut by guillotine 68, the assembly drops into recess 71. The turret head 73 is rotated (in an anti-clockwise direction as shown) to carry the assembly through index positions B to G. In a position before position G, the free end of wire 43 projecting beyond cap 54 is bent by a device, similar to device 60, which has not been shown to avoid overloading the drawing. At position G a soldering device similar to that at position 10 solders the wire to cap 54. The fuse then is cooled while passing through index positions J to L where it is engaged by spring contact 81 of apparatus (not shown) for an electrical continuity check; there being a second contact in the base of each recess 71 to complete the circuit of the checking apparatus. The completed fuse then passes to index position M where it is free to fall under gravity to a chute 82 having a "flip-flop" plate 83 in the throat thereof movable in response to the continuity check to deflect the fuse into a "reject" duct 84 or "pass" duct 85 leading from the chute 82.

The feed of bottom caps 54, bodies 56 and top caps 57 is provided by vibrating feed bowls 54a, 56a and 57a (FIG. 3). Bowls 54a and 57a provide a stream of caps 54 and 57, to tangential feed tubes 54b and 57b, respectively, while bowl 56a provides a stream of bodies 56 directed to tangential feed tube 56b; the arrangement is of generally known form and providing the caps and bodies in a desired orientation to be offered sequentially to successive needles 39. The sequential feed of caps and bodies can be regulated by known means, for example, a Dixon ESI escapement, represented diagrammatically at 86.

The device for feeding caps 54 to a needle at position 1 (FIG. 5) comprises a plate 100, guided by rollers mounted on a part of the machine frame F. The frame carries a jaw 103 pivoted at 104 and carrying a cam follower 105 operated by a cam carried by one of two guide blocks 108 on the plate 100. A slider 106 fast with a rod 107 is slidable in the guide blocks 108 on the plate. An actuator arm movable about a pivot axis normal to frame F operates the slider and the plate. Jaw 103 serves to centre a needle 39 in cooperation with an anvil 110 mounted on the frame. Cap receiver jaws 111 are pivoted on the guide block 108 nearest the turret axis and are biased toward one another by spring 111a. Rollers 112 on the jaws 111 cooperate with cam tracks carried by a pillar 112a on the frame F.

When a cap is to be delivered, the plate is held in the radially outermost position by the actuable arm against a stop 115 as also is slider 106 held outwardly relative to the plate. The jaws 111 are closed. A cap is delivered to a recess defined by the uppermost face of each jaw and between rearwardly directed shoulders 111b on the jaws and the front of rod 107. The slider is advanced relative to the plate by tension springs 106a as the actuator arm initially moves. Thereby rod 107 advances in the jaws and a cap delivered to the recess is clamped in the recess. The jaw 103 closes on the anvil as the plate advances and cams that jaw. Before the plate reaches a stop 116, and in the last part of its travel, the jaws 111 are cammed open and disengage from the cap leaving it on the needle. The rod 107 is hollow to allow the cap to be positioned well in from the needle end.

At position 2 a pusher 120 (FIG. 6) on a guide rod 121 reciprocable by an actuator 122 advances cap 54 to the base of the needle so that the cap will pass under cam track 55.

At position 5 a cap applicator is provided similar to that at station 1 save that the actuator arm includes a limb 130 (FIG. 7) which is coupled to carry a stop 130a in the path of a roller 131 on spindle 131a set in a bell crank jaw 132. Jaw 132 is one of a pair of bell crank jaws operable to centre a fuse body. The other jaw of the pair has a channel which engages the actuator spindle 131a and is thereby a slave to the first jaw. In the case of the applicator at position 5, the jaws 111' which receive the cap are located radially outwardly of a second pair 133 which together define a conical lead-in for the needle as the jaws advance toward the turret. There are two rods operated by the slider, one main rod 107' visible in FIG. 7 to form a recess in cooperation with the main jaws 111' and the front jaws 133. Rod 107' includes a cam track 107b to open the main jaws 111' as those jaws reach their outermost position at which rod 107' will move further out compressing a spring 135 between a slider 106' and a rear guide block 108'. Front jaws 133 open against a fixed cam on the frame as soon as the needle engages the cap.

At position 7 the device to bend the wire over the outer end cap is formed of a plate 140 (FIG. 8) guided by rollers 141 and operated by an arm engaging a rod 143 received by a guide block 144. A compression spring 145 biases the rod radially outwardly. Jaws 146 are pivoted on a common spindle 147 and have arms 148 tied back to the rod. One jaw carries an anvil 149a slidable between guides 149, the jaws being positioned radially outwardly of a wire positioning element 150 fast with the guide block. The action is to drive the plate toward the turret thereby to position the positioning element 150 and continued advance of the rod moves the guides and anvil to bend the wire protruding through the positioning element.

At position 10 a plate 151 (FIGS. 9 and 9a) is guided by rollers 152. On plate 151 is a plate 153 whose rollers 153a engage the edges of plate 151. An actuator arm is coupled to a pin 154 fast with upper plate 153 and pin 155 on the plate 151 is received by an elongate slot in upper plate 153. Springs 156 urge both plates radially inwardly relative to the turret. Carried on plate 153 is a pair of soldering wire guides 157, 158 and wheels 159, 160 to drive wire forward. One wheel 160 is toothed and pawls 161 engage the toothed wheel. A drive lever 162 pivoted at 163 on the axis of wheel 160 will travel with plate 153 between stops 164 and 165, set on the machine frame. Fuse body centering jaws 166, of which only the upper one is visible in FIG. 9 and the lower one is omitted in FIG. 9a, are pivoted on spindle 167 set in block 168 secured to the machine frame. The jaws 166 are operably biased together by a spring 169 and are held open when plate 151 is in its outer position by a hook 170 engaging an arm fast with one jaw. When plate 151 moves in, the hook allows the associated jaw to close. The other jaw also closes being a slave to the first. A pair of heating elements 171, 172, in the form of carbon brushes, is mounted on a terminal block 173, the latter element being static and the former pivotable, about spindle 174, away from element 172 by a follower 175 cooperating with a cam carried by plate 153. The element 171 rises, as the plate 153 moves away from the turret, against the action of a compression spring 176. With the plate 151 displaced at its radially outermost position a fuse arrives at position 10. The element 171 is held away from element 172 and jaws 166 are open. The actuating arm allows the plates to move under bias radially inwardly relative to the turret. Over a first part of plate travel jaws 166 close. If no fuse is present they close sufficiently far to bring an arm on one jaw into the path of plate 151 and no further movement occurs. Jaws 166 having closed on to a fuse body when present, further travel of plate 151 places element 171 in contact with the fuse cap. The heater circuit is pulsed to cause current to flow through the elements 171, 172 and cap to heat the cap. The last part of the travel brings plate 153 to a position touching the solder wire on the cap. The plates are then driven away from the fuse cap. The jaws and heating elements separate under the action of the hook and cam respectively and when the bottom plate 151 is arrested by a stop, top plate 153 continues to withdraw, pin 155 moving in its slot in plate 153. Lever 162 meets the stop 165 and is rotated thereby upon further withdrawal of plate 153. This will rotate toothed wheel 160 clockwise as seen in FIG. 9 thereby advancing the soldering wire for the next fuse.

At position 14 a plate 180 (FIG. 10) is movable between rollers 181 on the main frame. A pin 182 is set in the frame and engages a slot 183 in the plate. Friction washers 185 on the pin are biased against the plate by springs 186. An actuator arm operates a rod 188 slidable in a block 189 on the plate. Rod 188 actuates a pair of bell crank jaws 190 pivoted on a pin 191. When a fuse arrives at position 14, the plate is in its position nearest the turret and the jaws are open. The rod 188 moves radially outwardly relative to the turret. Because of the resistance of the washers the jaws shut before the plate moves. The plate then moves outwards and the fuse body is pulled outwardly off the needle by the jaws. Upon reversal of the rod movement, the jaws open due to the resistance of the washers and the fuse body is released and moves on to the next station.

The sand box 65 is shown in detail in FIGS. 11 and 11a. It is mounted on parallel links 200, has a pervious base plate 201 beneath which is a manifold 202 fed by a pipe 203. Each of a pair of arms 204, one on either side of the path of needles indexed by the turret, is pivoted about a spindle 204a which at its lower end has a lever 205a. The arm furthest from the frame is slave to the other which has a lever arm 207 in the vertical path of which is a roller 208 mounted on the frame. The arms 204 are biased together by a spring 210 and as the box approaches the low point of its travel the arms 204, until then together so that bristles 211 clean the needle, can separate under the action of roller 208. A catch 212 keeps the arms open, the catch releasing on reelevation of the box when a trip arm 213 on the catch meets a stop 214.

At position 19 a pair of spring jaws 220 (see also FIGS. 1 and 12) prolong cam track 55. Movable radially relatively to the turret is a body 221 carrying cap jaws 222 biased apart and one being operable by a fluid operated piston 225 also carried by the body. The other jaw is slave to the first. A pair of bell crank centering jaws 226 are carried by the frame F and are pivotal by a second cylinder (not shown) again one jaw being slave to the other. The cap jaws move in a plane containing the turret axis and can move to lie over a cap resting on spring jaws 220 which pivot about axes parallel to the turret axis. Body 221 is movable by an actuator arm 226 and in the body is a push rod 227 biased away from the turret relative to the body to bear against a cam 228 mounted on the frame for limited angular movement. When a fuse body arrives at position 19, cap jaws 222 engage on the closed end of the cap and the centering jaws engage the fuse body. The actuator arm moves to draw the body 221 away from the turret and the cap and cap jaws open and pass through the spring jaws 220. As the body 221 continues to move away from the turret the rod 227 engaging cam 228 projects from the body and the fuse assembly is compressed between the rod and the cap jaws. As the body completes its movement the cam 228 makes its angular motion and allows the rod to withdraw slightly into the body. The jaws are opened and the fuse is indexed away from position 19.

At position 21 an actuator arm 230 (FIG. 13) operates a spindle 231 to drive a chute 232 clockwise from the position shown against a bias of a spring 233 to allow a fuse to move to position 21. A fluid operated piston (not shown) is coupled to an arm 234 pivoted at 235 and carrying a guillotine element 236 cooperating with an anvil 237. When a fuse arrives at position 21, chute 232 is allowed by the arm 230 to swing into position as shown under its bias. The fuse wire coupling the fuse to the turret is positioned over the anvil when the fuse arrives at position 21. When the guillotine operates, the fuse drops down the chute to be received in recess 71 in the secondary turret.

The orientation of the turrets 31 and 70 is not critical although they most conveniently are as shown, that is, rotatable about a generally horizontal axis with the turret heads generally vertical. Clearly the orientation of the body 56 at index positions 17 and 18, and hence the location of these index positions, is important to ensure adequate filling of the body with sand. Additionally, the positioning of the container 65 below the turret head 32 is important in preventing the introduction of sand into the housing or turret head 32. During operation it may be preferred to feed air into the turret to maintain air over-pressure therein to act against ingress of sand.

The location of other index positions is not so important. However it is desirable for index positions coinciding with stations at which the wire is soldered to a cap for the flux to escape upwardly without contacting and thereby condensing on the body.

It will be appreciated that means other than a fluidised bed can be used for filling the bodies with sand. Additionally the turret 31 can be rotated by an indexing cam actuated by an intermittent drive if required.

While the caps have been described as pressed on to the body they may be glued and the body may be glass instead of ceramic.

It will be appreciated that the present invention provides a convenient means by which a high output of fuses, having the same or different ratings, can be maintained over a substantial period. Additionally, because of the compact nature of the apparatus, it can readily be provided with a lockable enclosure to safeguard the spools of wire when the apparatus is not in use.

What we claim is:

1. Apparatus for assembling a plurality of components on a common elongate element, the apparatus including turret means provided with a plurality of elongate guides for elongate elements, means to index the turret means to offer each guide sequentially to a plurality of stations, component feed means at a plurality of stations each operable to apply a component to a guide and component positioning means at at least one station operable to position a component relative to an element in a guide and thereby establish the components relative to the element and to the turret means.

2. Apparatus according to claim 1 in which the element is a wire, wire storage means being provided on the turret means to feed wire to each guide.

3. Apparatus according to claim 2 in which the wire feed means include means permitting the wire to be drawn from a guide, said means being operable to drive wire through the guide.

4. Apparatus according to claim 3 in which the wire feed means include a block movable radially relative to the turret means axis under action of a spring and a cam track, the wire being clamped to the block by a leaf spring anchored to the block and having a free edge directed radially outwardly of the turret means and operable upon radial outward displacement of the block to drive the wire.

5. Apparatus according to claim 4 in which the turret means includes a hollow shaft, adjacent one end of which are mounted wire storage spools, and adjacent its other end includes an axially directed annular wall from which the guides radiate and a plurality of guide means for the blocks.

6. Apparatus according to claim 2 in which the article to be assembled is an electric fuse of the type referred to, there being three component feed stations to feed a cap, then a body, then a cap, and a positioning station to secure the last fed cap to the wire, the guides comprising tubular members.

7. Apparatus according to claim 6 in which the first component feed means comprises a pair of jaws on a jaw carrier movable toward and away from a guide in the first station axially of a needle guide thereat, the jaws being recessed to receive an end cap, a rod on the jaw carrier movable relative thereto axially of the rod and parallel with the path of the jaw carrier, means biasing the rod relative to the carrier toward the jaw recess and an actuator operable to hold the rod and jaw carrier at their positions remote from a guide at the station, to allow the rod to move toward the guide to hold a cap delivered to the recess therein, and to drive the rod, jaw carrier and jaws toward the guide cam means being provided operable to open the jaws as they approach a position where the guide is received by a bore in the rod, and to withdraw the parts to their initial condition.

8. Apparatus according to claim 7 in which means are provided at an adjacent station to push a cap to the base of the guide.

9. Apparatus according to claim 6 in which a cam track is provided to hold the first fed cap at the base of the guide.

10. Apparatus according to claim 6 in which the second component feed means is a delivery tube coaxial with a guide at the second component delivery station, means being provided to deliver single components to the station.

11. Apparatus according to claim 6 in which the third component feed means includes a cap jaw carrier, cap jaws on the cap jaw carrier biased together and defining a recess to receive a cap, a rod mounted on the cap jaw carrier for movement relative thereto and axially parallel therewith, the rod being operable to drive the cap jaw carrier and jaws to apply a cap to a guide at the third component delivery station and to withdraw.

12. Apparatus according to claim 11 including a pair of guide jaws which with the rod define the axial limits of the cap recess, cam means being provided to open the pair of guide jaws as the cap jaw carrier reaches a position where the guide is received by a bore in the rod, a lost motion being provided between the rod and the cap jaw carrier as the cap jaw carrier reaches its position remote from the guide, cam means carried by the rod to open the cap jaws as the rod is moved away from the guide relative to the cap jaw carrier.

13. Apparatus according to claim 11 in which a pair of fuse body engaging jaws are provided at the third component delivery station, means being provided operable by the rod to open the body jaws.

14. Apparatus according to claim 6 in which at the or each component position station positioning means comprise a pair of positioning carriers both movable toward a fuse at the positioning station, a lost motion connection being provided between the positioning carriers and both being biased toward the needle guide, a solder guide on the positioning carrier and solder feed means to advance solder from a store through the guide, a pair of heating elements movable toward and away from the last fed cap, and an actuator operable to position the positioning carrier supporting the solder guide at a position relative to the other positioning carrier remote from a fuse at the positioning station and to position that other positioning carrier remote from the fuse and to allow the positioning carrier to move under their bias toward the fuse guide, to thereby close the heating elements on to the cap by action of a cam and follower moved relative to one another by a positioning carrier, and to advance solder in the guide to the cap.

15. Apparatus according to claim 14 including a pair of fuse body steadying jaws at the positioning station operable by a positioning carrier to engage a fuse body.

16. Apparatus according to claim 14 including a wire former upstream in the indexing direction at the first positioning station, the former including a forming carrier movable toward a guide at a forming station by a rod movable axially relative to the forming carrier, a bias being provided which when the forming carrier reaches its position nearest the guide is overcome by the rod which then moves relative to the forming carrier to actuate an anvil relative to a guide, both supported by the forming carrier, to bend wire projecting through the last fed cap.

17. Apparatus according to claim 6 including an extractor station downstream of the first positioning station including extractor means to draw the body and last fed cap off a guide.

18. Apparatus according to claim 17 in which the extractor means comprises a pair of jaws provided on an extractor carrier requiring a relatively high force to move it compared with the force required to operate the jaws, an actuator being provided coupled to a jaw operating rod guided on the extractor carrier, which rod will open the jaws against the resistance of the extractor carrier as the rod is urged toward a guide and close the jaws on retraction of the rod.

19. Apparatus according to claim 17 including a reciprocable sand box including means to fluidise sand therein, the box being movable to immerse a body drawn off a guide to thereby allow sand to fill the body round the wire.

20. Apparatus according to claim 6 including a compressor to receive a last fed cap and body and apply the first fed cap to the body.

21. Apparatus according to claim 20 in which the compressor includes a pair of cap jaws to engage the closed end of the first fed cap, a compressor body carrying those jaws and an anvil in the compressor body bearing against a stop, the cap jaws being movable relative to the anvil to urge the first fed cap toward the body and the body, with the last fed cap leading, toward the anvil, and the anvil toward the stop.

22. Apparatus according to claim 6 including guillotine means operable to sever a wire to release a set of components from a guide.

23. Apparatus according to claim 6 wherein the turret means includes a main turret provided with the guides and a secondary indexable turret having means to receive a set of components on a wire from the main turret, means being provided at a second positioning station of the secondary turret to position the first fed cap relative to the wire.

24. Apparatus according to claim 1 in which the turret means is rotatable by a roller in respect of each guide the roller being successively engageable by an indexing cam.

25. Apparatus according to claim 1 in which the turret means is rotatable about a horizontal axis.

* * * * *